US008393204B2

(12) United States Patent
Nornes et al.

(10) Patent No.: US 8,393,204 B2
(45) Date of Patent: Mar. 12, 2013

(54) TIRE PRESSURE MEASUREMENT SYSTEM WITH REDUCED CURRENT CONSUMPTION

(75) Inventors: Jan Einar Nornes, Horten (NO); Bjorn Blixhavn, Tonsberg (NO)

(73) Assignee: Infineon Technologies AG, Neubiberg (DE)

( * ) Notice: Subject to any disclaimer, the term of this patent is extended or adjusted under 35 U.S.C. 154(b) by 186 days.

(21) Appl. No.: 13/046,859

(22) Filed: Mar. 14, 2011

(65) Prior Publication Data

US 2011/0163737 A1 Jul. 7, 2011

Related U.S. Application Data

(63) Continuation of application No. 12/105,853, filed on Apr. 18, 2008, now Pat. No. 7,954,369.

(30) Foreign Application Priority Data

Apr. 27, 2007 (EP) .................................... 07107174

(51) Int. Cl.
G01M 17/02 (2006.01)
(52) U.S. Cl. ......................................................... 73/146
(58) Field of Classification Search .................... None
See application file for complete search history.

(56) References Cited

U.S. PATENT DOCUMENTS

| 3,200,322 A | 8/1965 | Rhyne et al. |
| 3,303,417 A | 2/1967 | Walton |
| 3,350,629 A | 10/1967 | Kirby |
| 3,810,090 A * | 5/1974 | Davis et al. .................... 340/447 |
| 6,362,732 B1 * | 3/2002 | Konchin et al. ............... 340/446 |
| 6,535,116 B1 | 3/2003 | Zhou |
| 6,543,279 B1 * | 4/2003 | Yones et al. .................. 73/146.5 |
| 6,807,853 B2 | 10/2004 | Adamson et al. |
| 7,363,806 B2 | 4/2008 | Huang et al. |
| 2006/0028333 A1 | 2/2006 | Tyndall |

OTHER PUBLICATIONS

Non-Final Office Action Dated Jun. 6, 2010 for U.S. Appl. No. 12/105,853, 16 Pages.
Final Office Action Dated Sep. 23, 2010 for U.S. Appl. No. 12/105,853. 12 Pages.
Notice of Allowance Dated Feb. 8, 2011 for U.S. Appl. No. 12/105,853. 15 Pages.

* cited by examiner

*Primary Examiner* — Lisa Caputo
*Assistant Examiner* — Jermaine Jenkins
(74) *Attorney, Agent, or Firm* — Eschweiler & Associates, LLC

(57) ABSTRACT

A tire pressure measurement system (TPMS) includes a capacitor and an integrated circuit configured to receive a supply voltage. The integrated circuit includes a voltage regulator and a measurement unit. The voltage regulator is configured to be turned on and off for predetermined periods of time such that the capacitor is charged and discharged, respectively. The voltage regulator and the capacitor are connected to the measurement unit in order to selectively provide electric charge at a voltage between predetermined upper and lower limits.

22 Claims, 3 Drawing Sheets

TIRE PRESSURE MEASUREMENT SYSTEM WITH REDUCED CURRENT CONSUMPTION

RELATED APPLICATIONS

This application is a Continuation of application Ser. No. 12/105,853 filed Apr. 18, 2008, entitled "TIRE PRESSURE MEASUREMENT SYSTEM WITH REDUCED CURRENT CONSUMPTION," which claims priority to Application No. EP 07107174.0 filed Apr. 27, 2007, entitled "TIRE PRESSURE MEASUREMENT SYSTEM WITH REDUCED CURRENT CONSUMPTION," which is incorporated herein by reference in its entirety.

FIELD OF INVENTION

The present invention relates to a tire pressure measurement system (TPMS) where a wheel module, including a measurement unit, is located inside the tire, and is supplied from a power source of limited capacity. Examples of such power sources are electrochemical batteries, piezoelectric power generators or inductive power generators.

BACKGROUND

Wheel modules include one or more integrated circuits to perform measurement and signal processing tasks required by the system. The integrated circuit is programmed to wake up for less than a second at intervals of typically 10-30 seconds, to perform measurements and transmit data. The rest of the time is spent in the sleep (powerdown) mode, where only a timer circuit is active. Since more than 99% of the time may be spent in sleep mode, the power consumption of the device in this mode is obviously of importance.

When produced in the currently used technologies, such integrated circuits have a maximum limit for the internal supply voltage of the digital core circuits which is less than the voltages provided by the energy sources mentioned above. A voltage regulator or converter is therefore required to adapt the supply voltage to a level that is compatible with the digital core of the integrated circuits.

It is often the case that the integrated circuit includes special higher voltage elements, so that the voltage regulator can be provided on the same chip as the low voltage digital core.

Due to the limited capacity of the power sources, it is important that the power consumption of the wheel module is minimized. Typically, voltage regulators are used for voltage conversion. The voltage regulator requires a certain bias current to operate, and this current constitutes a significant part of the sleep mode power consumption.

SUMMARY OF THE INVENTION

A tire pressure measurement system (TPMS) is described herein. The system comprises: a capacitor; and an integrated circuit configured to receive a supply voltage, the integrated circuit comprising: a voltage regulator; and a measurement unit; wherein the voltage regulator is configured to be turned on and off for predetermined periods of time and arranged such that the capacitor is charged and discharged, respectively. The voltage regulator and the capacitor are connected to the measurement unit in order to selectively provide the measurement unit electric charge at a voltage between predetermined upper and lower limits. The average bias current of the voltage regulator is reduced by turning it on and off at fixed intervals. While the regulator is turned off, current is supplied from the capacitor.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

Examples of the present invention will now be described with reference to the accompanying drawings, in which.

DETAILED DESCRIPTION OF THE INVENTION

Figure 1A:
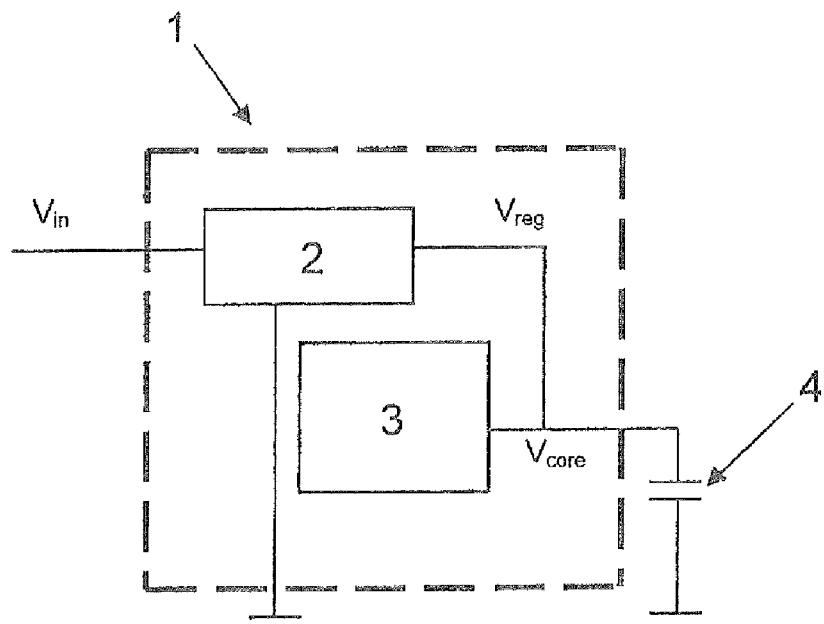
FIG. 1a shows an integrated circuit of a tire pressure measurement system (TPMS)

With reference to FIG. 1a, a TPMS wheel module comprises an integrated circuit 1 that is supplied with an external supply voltage $V_{in}$ which varies between the voltages $V_{in\_max}$ and $V_{in\_min}$. The integrated circuit 1 comprises a voltage regulator 2 configured to receive the external supply voltage, in the range between $V_{in\_max}$ to $V_{in\_min}$, inclusive, and produces a regulated output voltage $V_{reg}$ within the limits $V_{reg\_max}$ and $V_{reg\_min}$. The integrated circuit 1 further comprises a digital core 3 requiring a supply voltage between the levels $V_{core\_max}$ and $V_{core\_min}$, inclusive.

When $V_{in\_max} > V_{core\_max}$, the digital core 3 cannot be connected directly to the external supply voltage, and a voltage regulator 2 must be inserted between the external supply voltage and the digital core 3. The voltage regulator 2 creates a voltage drop between the external supply voltage and the digital core 3, ensuring that $V_{core\_max} > V_{reg\_max}$. For proper operation of the device, it is also necessary to have $V_{in\_min} > V_{core\_min}$, and $V_{reg\_min} > V_{core\_min}$.

For earlier semiconductor technologies using batteries as a power source, the voltage regulator was in many cases not needed since $V_{core\_max} > V_{in\_max}$ (i.e., the supply voltage range included the battery voltage). For designs using current semiconductor technologies, or using other types of power generators, this is in general not the case, and a voltage regulator is required. This problem also arises in the field of energy harvesting devices, as these frequently generate relatively high voltages. In order to operate correctly, the voltage regulator draws a certain amount of current in its control circuits. This current, called the regulator bias current, is drawn from the battery in addition to the current required by the digital core. Several design techniques are available to obtain sufficient circuit performance with very low current consumption. Nevertheless, the voltage regulator bias current is of the same order of magnitude as the supply current to the digital core when in sleep mode.

Thus, the regulator increases the load on the power source, which in turn means that the power source must be increased, leading to added size, weight, and cost. Since TPMS systems must minimize all these parameters in order to be efficient, a way to minimize or eliminate the voltage regulator bias current is desirable.

Figure 1B:
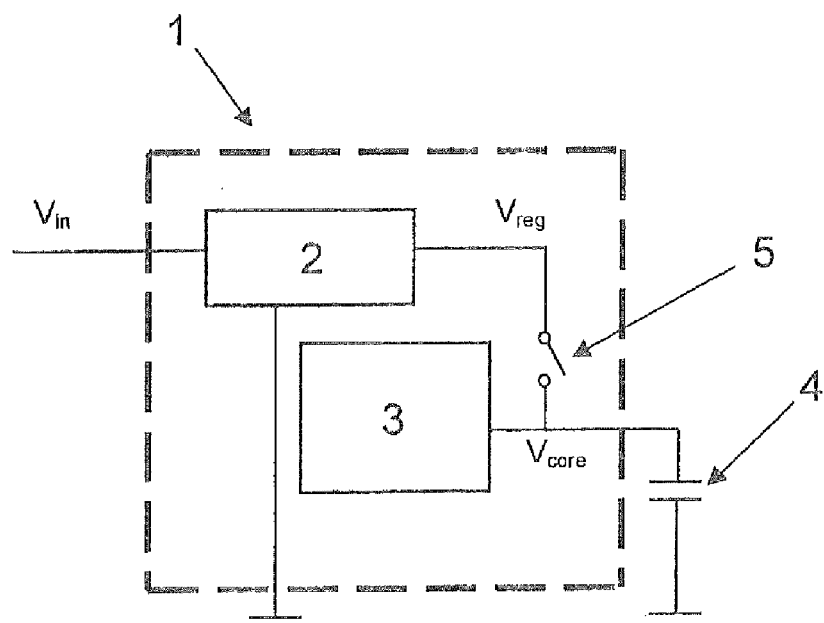
FIG. 1b shows an integrated circuit of a TPMS according to an embodiment.

FIG. 1b shows an example of the present invention in which a voltage regulator 2 is turned on for brief periods to charge a capacitor 4. When the voltage regulator 2 is in an off state, a digital core 3 (e.g., measurement unit) is supplied by the charge stored on the capacitor 4. By correctly choosing the on and off times of the voltage regulator 2, the $V_{core}$ voltage can be maintained between the limits $V_{core\_max}$ and $V_{core\_min}$, while at the same time reducing the average bias current of the voltage regulator 2. Additionally, a switch 5 is closed and opened under control of the digital core. Typically, the present invention reduces the average bias current by 75% or more, resulting in a significant battery saving over the lifetime of the device.

Figure 2:
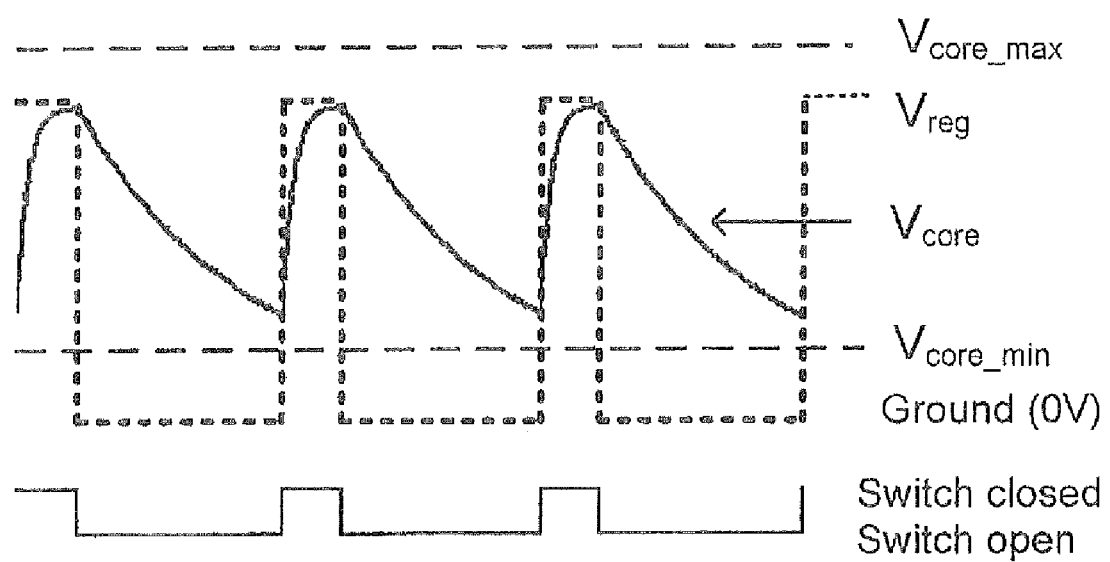
FIG. 2 shows a comparison of the various voltages of the circuit according to an embodiment.

FIG. 2 shows how the $V_{core}$ voltage will vary between $V_{core\_max}$ and $V_{core\_min}$ as the voltage regulator is turned on and off (i.e., duty cycled) and the switch 5 is closed and opened, respectively. The switch 5 on (closed) time must be sufficient to charge the capacitor to the $V_{reg}$ voltage while the voltage regulator 2 is in the on state, and the switch 5 off (open) time must be short enough to ensure that the $V_{core}$ voltage will never fall below $V_{core\_min}$ while the voltage regulator 2 is in the off state and the capacitor 4 is discharging.

The purpose of the switch is to avoid leakage of charge from the capacitor back into the voltage regulator when the latter is turned off. Therefore, the switch can be dispensed with if the voltage regulator presents a high impedance in the off state. However, if the switch is needed, then the switch must be closed (conducting) when the regulator is on, and open (isolating) when the regulator is off. The control signal(s) from the digital core must change the state of the switch and the voltage regulator in synchronism.

The voltage regulator can be realized in a number of ways, for example, by a conventional linear regulator with a fixed output voltage, or a combination of a comparator and a switch.

Figure 3:
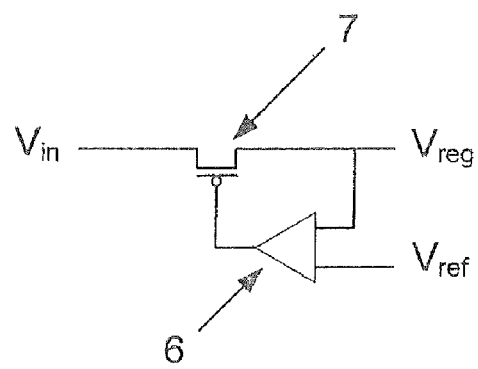
FIG. 3 shows an example of a voltage regulator of the integrated circuit of FIG. 1b.

An example of a voltage regulator 2 is shown in FIG. 3. The two exemplary types of regulator mentioned above share the majority of the circuit elements, such as a voltage reference $V_{ref}$, a comparator/error amplifier 6, and a switch/pass transistor 7. The main difference is in the type of regulation. The linear regulator must be designed to be stable, while the switching circuit is by design unstable.

In the case of a comparator, when turned on, the switch passes current to the capacitor, until the comparator decides that the capacitor voltage has reached its upper limit and turns off the switch. While the comparator is used to turn off the charging current to the capacitor, the turn-on time has to be determined by the control logic, as previously described.

There are several possible solutions to control the on and off timing to ensure a $V_{reg}$ between $V_{core\_max}$ and $V_{core\_min}$.

The on and off times can be calculated based on simulations or measurement data, and fixed in the digital core 3. By using fixed timing, the need for a circuit to detect if $V_{core}$ is close to $V_{core\_min}$ is avoided, thus avoiding another potential current consumer.

To optimize for lowest possible charge consumption, several different timing schedules can be selected by the digital core 3 before it enters the sleep mode based on, for example, the expected current load in sleep mode. The timing schedule can be influenced by parameters (e.g., calculated current consumption based on activated modules during sleep mode, measured temperature, and measured battery voltage).

Those skilled in the art will take proper design practice into account, such as allowing for temperature variation of current, considering the effect of the capacitor on the stability of the voltage regulator 2, and considering the effect of timing difference between the turn-on of the voltage regulator 2 and the closing of the switch 5. It should also be appreciated that other types of voltage regulators may be employed to implement the invention.

Figure 4:
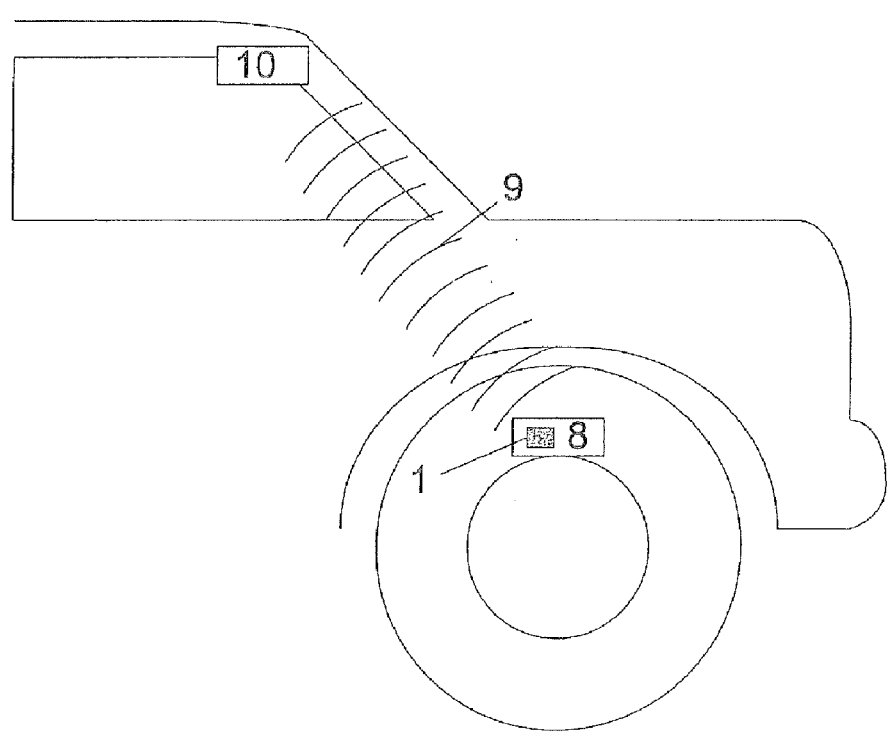
FIG. 4 shows an example of an arrangement of a TMPS according to an embodiment.

FIG. 4 shows an implementation of a TPMS according to an embodiment of the present invention in a vehicle wheel. The system comprises a wheel module 8 that houses the integrated circuit 1 that performs measurements for determining the tire pressure and transmits data by RF electromagnetic waves 9 to an external receiver 10.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. A tire pressure measurement system, comprising:
   a capacitor;
   a voltage regulator connected to the capacitor and configured to receive a supply voltage, the voltage regulator configured to be turned on and off for predetermined periods of time such that the capacitor is charged and discharged, respectively; and
   a measurement unit operably coupled to the voltage regulator and the capacitor, the measurement unit being configured to generate a control signal to control the on and off states of the voltage regulator such that a voltage between predetermined upper and lower limits is selectively provided to the measurement unit by the voltage regulator during the periods of time for which the voltage regulator is turned on, and by the capacitor during the periods of time for which the voltage regulator is turned off.

2. The system of claim 1, further comprising:
   a switch controlled by the measurement unit to be closed and opened to allow the capacitor to charge and discharge, respectively.

3. The system of claim 1, wherein the voltage regulator has a high impedance output when turned off.

4. The system of claim 1, wherein the measurement unit is configured to store the time periods for which the voltage regulator is to be turned on and off, the time periods being calculated based on simulations or measurement data.

5. The system of claim 4, wherein the measurement unit is configured to select, in advance of the measurement unit entering a sleep mode, a plurality of different timing schedules based on an expected current load in sleep mode.

6. The system of claim 4, wherein the time periods are calculated based on at least one parameter selected from the group including: calculated current consumption based on at least one activated measurement unit during sleep mode, measured temperature, and measured battery voltage.

7. The system of claim 1, wherein the voltage regulator comprises:
   a window comparator that defines minimum and maximum voltage levels, the time periods being calculated based on the defined voltage levels.

8. A tire pressure measurement arrangement configured to receive a supply voltage, perform measurements to determine tire pressure, and transmit data, comprising:
- a capacitor;
- a voltage regulator connected to the capacitor and configured to receive the supply voltage, the voltage regulator configured to be turned on and off for predetermined periods of time such that the capacitor is charged and discharged, respectively; and
- a measurement unit operably coupled to the voltage regulator and the capacitor, the measurement unit being configured to generate a control signal to control the on and off states of the voltage regulator such that a voltage between predetermined upper and lower limits is selectively provided to the measurement unit by the voltage regulator during the periods of time for which the voltage regulator is turned on, and by the capacitor during the periods of time for which the voltage regulator is turned off;
- a wheel module configured to house the capacitor, the voltage regulator, and the measurement unit; and
- an external receiver configured to receive data transmitted by the wheel module.

9. The system of claim 8, further comprising:
- a switch controlled by the measurement unit to be closed and opened to allow the capacitor to charge and discharge, respectively.

10. The system of claim 8, wherein the voltage regulator has a high impedance output when turned off.

11. The system of claim 8, wherein the measurement unit is configured to store the time periods for which the voltage regulator is to be turned on and off, the time periods being calculated based on simulations or measurement data.

12. The system of claim 11, wherein the measurement unit is configured to select, in advance of the measurement unit entering a sleep mode, a plurality of different timing schedules based on an expected current load in sleep mode.

13. The system of claim 11, wherein the time periods are calculated based on at least one parameter selected from the group including: calculated current consumption based on at least one activated measurement unit during sleep mode, measured temperature, and measured battery voltage.

14. The system of claim 8, wherein the voltage regulator comprises:
- a window comparator that defines minimum and maximum voltage levels, the time periods being calculated based on the defined voltage levels.

15. The arrangement of claim 8, wherein the wheel module is configured to transmit data via RF electromagnetic waves.

16. A method of operating a tire pressure measurement system including a capacitor, a voltage regulator, and a measurement unit, the method comprising:
- generating a control signal via the measurement unit to control the on and off states of the voltage regulator;
- turning on and off the voltage regulator for predetermined periods of time such that the capacitor is charged and discharged, respectively; and
- selectively providing a voltage between predetermined upper and lower limits to the measurement unit via the voltage regulator during the periods of time for which the voltage regulator is turned on and via the capacitor during the periods of time for which the voltage regulator is turned off.

17. The method of claim 16, further comprising:
- controlling a switch of the tire pressure measurement system to be closed and opened allowing the capacitor to charge and discharge, respectively, the switch being controlled via the measurement unit.

18. The method of claim 16, wherein the voltage regulator has a high impedance output when turned off.

19. The method of claim 16, further comprising:
- storing time periods for which the voltage regulator is to be turned on and off in the measurement unit, the time periods being calculated based on simulations or measurement data.

20. The method of claim 19, wherein the time periods are calculated based on at least one parameter selected from the group including: calculated current consumption based on at least one activated measurement unit during sleep mode, measured temperature, and measured battery voltage.

21. The method of claim 16, further comprising:
- selecting, in advance of the measurement unit entering a sleep mode, a plurality of different timing schedules based on an expected current load in sleep mode.

22. The method of claim 16, wherein the voltage regulator comprises:
- a window comparator that defines minimum and maximum voltage level the time periods being calculated based on the defined voltage levels.

* * * * *